United States Patent
Matabosch I Geronès et al.

(10) Patent No.: US 8,340,401 B2
(45) Date of Patent: Dec. 25, 2012

(54) METHOD AND SYSTEM FOR ALIGNING THREE-DIMENSIONAL SURFACES

(75) Inventors: Carles Matabosch I Geronès, Girona (ES); Josep Forest I Collado, Girona (ES); Jordi Fita I Mas, Girona (ES); Lluís Magí I Carceller, Girona (ES); Joaquim Salvi Mas, Girona (ES)

(73) Assignee: Aqsense S.L., Girona (ES)

( * ) Notice: Subject to any disclaimer, the term of this patent is extended or adjusted under 35 U.S.C. 154(b) by 357 days.

(21) Appl. No.: 12/673,495

(22) PCT Filed: Aug. 12, 2008

(86) PCT No.: PCT/EP2008/060601
§ 371 (c)(1),
(2), (4) Date: Feb. 13, 2010

(87) PCT Pub. No.: WO2009/021959
PCT Pub. Date: Feb. 19, 2009

(65) Prior Publication Data
US 2011/0200248 A1  Aug. 18, 2011

Related U.S. Application Data

(60) Provisional application No. 60/955,440, filed on Aug. 13, 2007.

(30) Foreign Application Priority Data

Aug. 13, 2007  (EP) ..................... 07114260

(51) Int. Cl.
G06K 9/00 (2006.01)
G06K 9/36 (2006.01)
(52) U.S. Cl. ........................ 382/154; 382/285
(58) Field of Classification Search .................. 382/154, 382/285
See application file for complete search history.

(56) References Cited

U.S. PATENT DOCUMENTS
5,175,773 A * 12/1992 Garreau et al. ............... 382/130
(Continued)

FOREIGN PATENT DOCUMENTS
GB  2355789 A  5/2001
(Continued)

OTHER PUBLICATIONS

Yang Chen et al., "Object Modeling by Registration of Multiple Range Images", Proceedings of the International Conference on Robotics and Automation, Sacramento, Apr. 9-11, 1991, Los Alamitos, IEEE Comp. Soc. Press, US, vol. 3 Conf. 7, pp. 2724-2729.

(Continued)

*Primary Examiner* — Brian Le
(74) *Attorney, Agent, or Firm* — Peter B. Scull; Hamilton, DeSanctis & Cha, LLP

(57) ABSTRACT

A method for associating a three-dimensional surface representing a real object and a three-dimensional reference surface, said reference surface being represented by a set of reference points, the method comprising: obtaining a set of real points representing the real surface, determining the normal vector of each point of said obtained set of real points, selecting, among the set of real points, control points according to the determined normal vector by converting the set of real points to a bi-dimensional space of normal vectors, generating sets of points having similar normal vector among the points of the set of real points and selecting, for each set of points with similar normal vector, one point that is a control point of the real surface, determining correspondence points close to the set of reference points that are determined to correspond to the control points of the real surface, and determining the motion that minimizes the distances between the control points of the real surface and the correspondence points.

12 Claims, 4 Drawing Sheets

U.S. PATENT DOCUMENTS

2005/0021163 A1     1/2005    Gu et al.

FOREIGN PATENT DOCUMENTS

GB           2389500 A     12/2003

OTHER PUBLICATIONS

Rusinkiewicz S. et al., "Efficient variants of the ICP algorithm", 3-D Digital Imaging and Modeling, 2001 Proceedings, Third International Conference on May 28-Jun. 1, 200, Piscataway, NJ, USA, IEEE, pp. 145-152.

Soon-Yong Park et al., "A fast point-to-tangent plane technique for multi-view registration", 3-D Digital Imaging and Modeling, 2003, 3DIM 2003 Proceedings, Fourth International Conference on Oct. 6-10, 2003, Piscataway, NJ, USA, IEEE, pp. 276-283.

Gagnon H. et al., "Registration of multiple range views for automatic 3-D model building", Computer Vision and Pattern Recognition, 1994 IEEE, pp. 581-586.

Matabosch, C. et al., "A variant of point-to-plane registration including cycle minimization", Photogrammetric Computer Vision '06, Sep. 20-22, 2006, pp. 61-66.

Besl P. J. et al., "A Method for Registration of 3-D Shapes", IEEE Transactions on Pattern Analysis and Machine Intelligence, IEEE Service Center, Los Alamitos, CA, US, vol. 14, No. 2, Feb. 1, 1992, pp. 239-256.

International Search Report, European Patent Office, Sep. 23, 2008.

Written Opinion of the International Searching Authority, European Patent Office, Sep. 23, 2008.

International Preliminary Report on Patentability, International Bureau of WIPO, Feb. 16, 2010.

\* cited by examiner

FIG.2
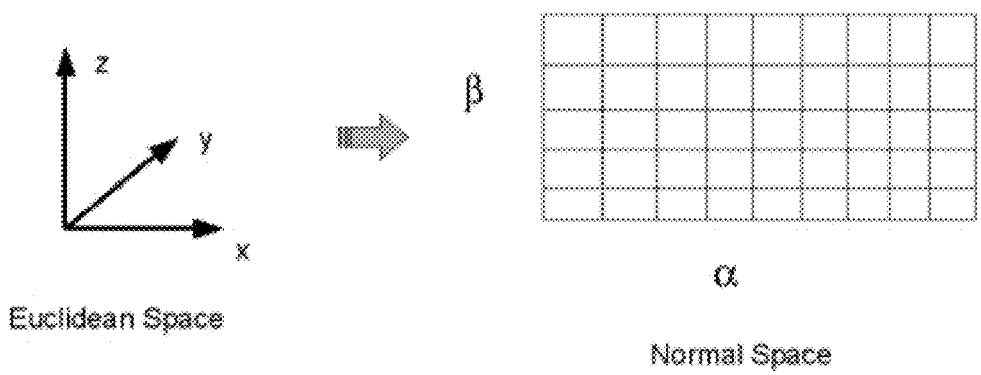
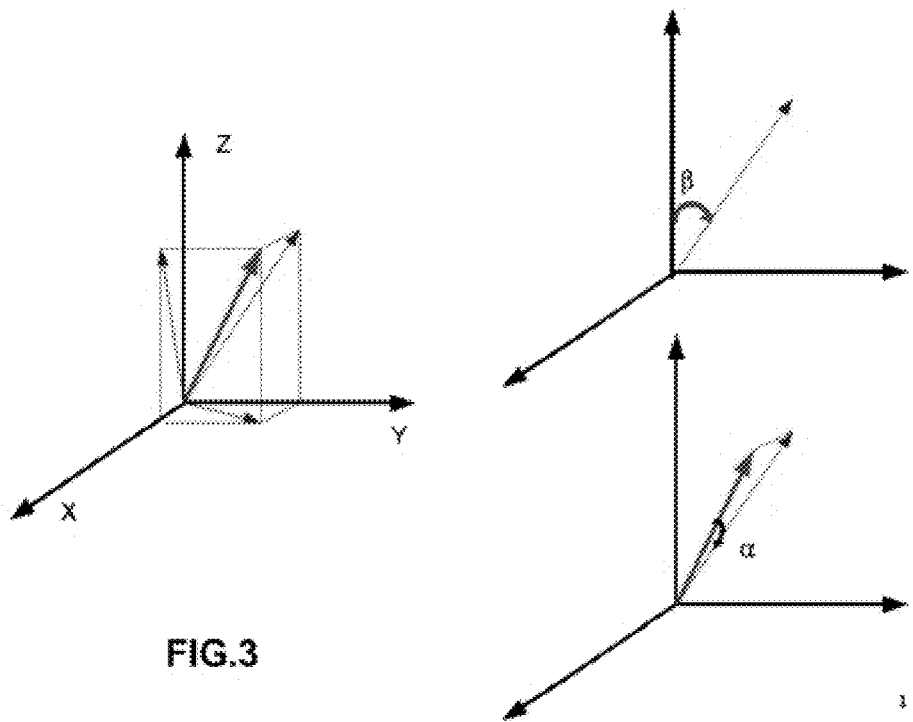
FIG.3

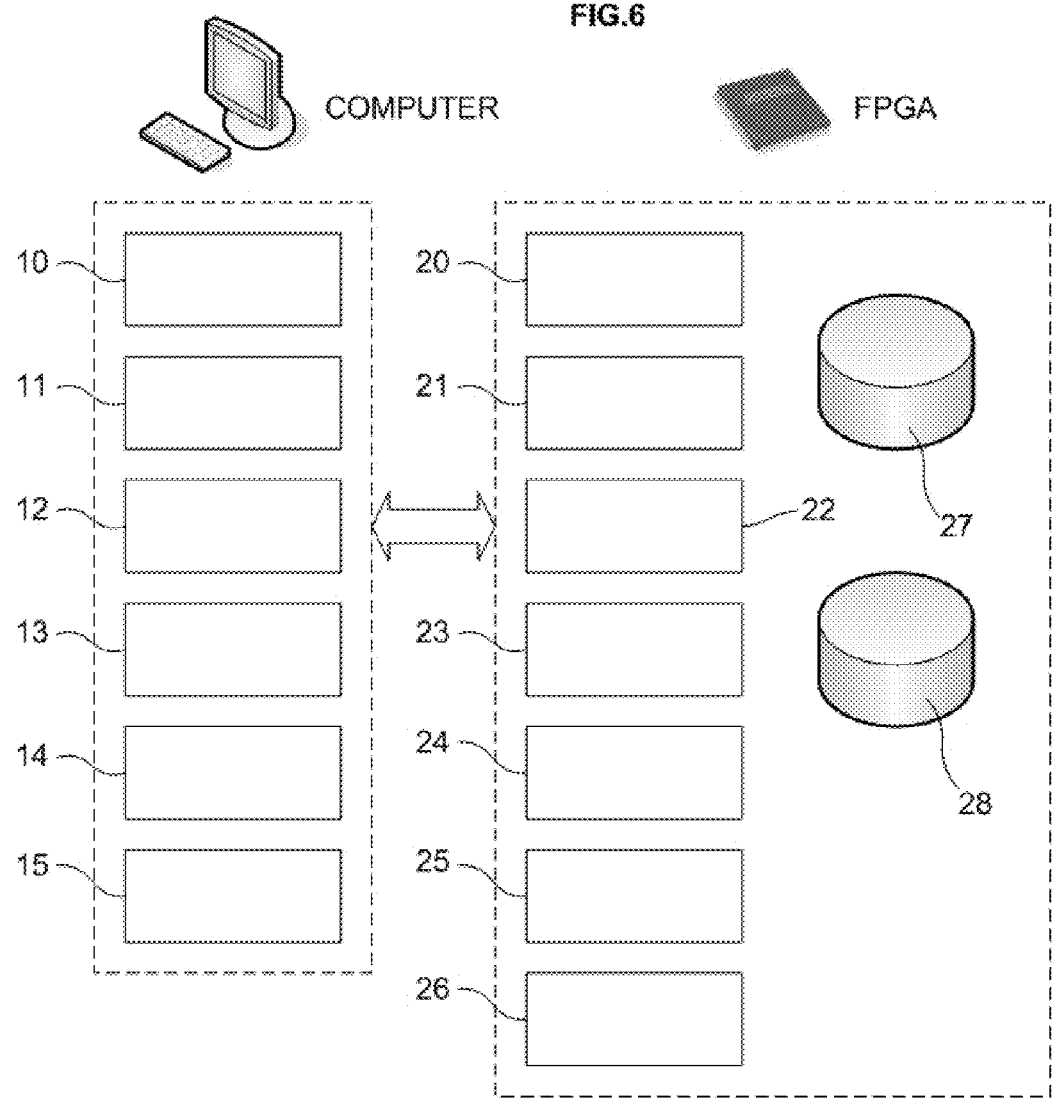

METHOD AND SYSTEM FOR ALIGNING THREE-DIMENSIONAL SURFACES

The present invention relates to a method for aligning a three-dimensional surface representing a real object and a three-dimensional reference surface. More specifically, the invention relates to a method for aligning an analyzed surface and a reference surface, each surface being represented by a cloud of points, so that the Euclidean motion between the two clouds of points is determined. In order to improve the registration accuracy, point-to-plane distance is used.

The invention also relates to a system for aligning a three-dimensional surface representing a real object and a three-dimensional reference surface suitable for carrying out such a method.

The invention may be used in three-dimensional quality control.

BACKGROUND ART

Computer vision is a huge and complex field that aims to simulate the human vision in order to perceive and interpret an object or scene. This perception task traditionally provides a bi-dimensional representation of the world. Human vision, on the other hand, is more complex and is able to retrieve information from the depths of a scene.

Three-dimensional quality control is a very important topic in computer vision. In order to detect errors on the analyzed surface, it is compared to a reference surface. The main problem is that both surfaces are not represented in the same coordinate frame. In this case, surfaces cannot be directly compared. To solve said problem, registration techniques (in computer vision, the techniques that align partial acquisitions are known as registration techniques) can be used to align both surfaces. This set of techniques determines the Euclidean motion between two sets of three-dimensional points. Registration (or aligning) is an interesting topic and actually the natural evolution of three-dimensional acquisition to explore techniques to achieve complete acquisitions of complex objects. In visual inspection tasks, the object must be aligned to the model before comparing them. This process can be applied to many industrial applications.

Most registration algorithms are based on the minimization of the distance between points of both surfaces. However, in order to increase the aligning accuracy, point-to-plane distance is used instead of traditional point-to-point. Point to plane distance is the distance between a point of the first surface (real or scan surface) and a local planar approximation in the second one (reference or model surface).

In 1991, Chen [Chen and Medioni, 1991] proposed an alternative to the point-to-point (ICP-Iterative Closest Point) algorithm, which was based on minimizing the distance between points and planes. The minimization function was selected to be the distances between points in the first image with respect to tangent planes in the second. That is, considering a point in the first image, the intersection of the normal vector at this point with the second surface determines a second point in which the tangent plane is computed.

A new algorithm to find these intersections between lines and range images was proposed, bearing in mind that the intersection of a given line with a cloud of points requires a high computational cost. A more accurate technique to find such a distance was proposed by Gagnon [Gagnon et al. 1994].

Finally, once the distances between points and planes were obtained, the motion that minimizes these distances was estimated by least squares. The process was repeated until convergence was attained.

In 2001, Rusinkiewick [Rusinkiewick and Levoy, 2001] presented several variations of this algorithm to improve the precision of it. The author proposed the "Normal Space Sampling". The main idea is to select more points in the region where the normal is different from the other parts of the surface. Using this sampling technique better results are obtained in low shaped surfaces.

In 2003, Park [Park and Subbarao, 2003] proposed a fast variant based on recursively computing the intersection between the line and the three-dimensional surface. This technique is based on an iterative point-to-projection, obtaining fast and accurately results.

Point-to-plane distance is normally more difficult to compute than point-to-point. When no normal information is given, the plane must be computed using neighborhood information, which requires a lot of time to detect this neighborhood, and not always with sufficient accuracy in the estimation of the normal vector.

The UK patent application GB 2 355 789, with title "Surface registration" (Tricorder Technology plc) describes a method for aligning two three-dimensional surfaces by associating correspondence points on the surfaces, a point on one surface (real surface) is associated with a point on the second surface (reference surface) by projecting the first point to a slope discontinuity on the second surface. Said method uses a point-to-triangle matching as a more sophisticated version of the ICP algorithm.

DISCLOSURE OF THE INVENTION

An object of the invention is therefore to provide a method for aligning a three-dimensional surface representing a real object and a three-dimensional reference surface, in a reduced time.

This object is achieved in accordance with claim 1 by providing a method for aligning a three-dimensional surface representing a real object and a three-dimensional reference surface, the method comprising the steps of:

a) Providing a cloud of points representing the reference surface;
b) Obtaining a cloud of points representing the real surface;
c) Scaling the cloud of points of the reference surface for obtaining a sub-cloud of points;
d) Scaling the cloud of points of the real surface for obtaining a sub-cloud of points;
e) Determining the normal vector of each point of the obtained sub-cloud of points of the real surface;
f) Obtaining, among the points of the sub-cloud of points of the real surface, control points according to the determined normal vector of said points;
g) Obtaining, from the points of the sub-cloud of points of the reference surface, the points corresponding to the control points of the real surface;
h) Obtaining the motion that minimizes the distances between the control points of the real surface and the obtained correspondence points.

In this way, the provision of step (c) of scaling the cloud of points of the reference surface allows to reduce the time for obtaining the correspondence points (step g) whereas the provision of step (d) of scaling the cloud of points of the real surface allows to reduce the number of normal vectors to be determined (step e) and the number of operations for obtaining the control points (step f). Further, the provision of either step (c) or step (d) allows reducing the number of operations for obtaining the motion (step h).

Consequently, the time for aligning the three-dimensional surfaces is considerably reduced and it allows using the method according to the present invention in, for example, a production line, for verifying the quality of all manufactured objects and not only of a reduced number of them.

Another advantage of the claimed invention is that a sub-sampling of the real surface is done (i.e. control points), so that the computational time is decreased. Moreover, if sub-sampled points are the more significant points, better performance is obtained. Said sub-sampling, called "Normal Space Sampling", is based on the normal vector information to detect significant points of the real surface.

The main object of the invention is to minimize the distances between the real surface and the reference surface by minimizing the distances between correspondences. As accurate correspondences are difficult to find, they are searched iteratively. The method finds correspondences and then obtains the motion that minimizes the distances between them. Applying said motion to the cloud of points of the real surface, this surface is moved near the reference surface, so that, more accurate correspondences may be determined. The method runs iteratively until the reference surface and the real surface converge.

According to an embodiment of the invention, the method further comprises a step (i) of verifying if the distances between the control points of the real surface and the correspondence points are smaller than a predetermined value. Said value is related to the required accuracy on the alignment and it depends on the context in which the method is used.

In case of negative result in step (i), the method may comprise the steps of:
  j) Transforming the control points of the real surface according to the motion that minimizes the distances between the control points of the real surface and the correspondence points;
  k) Obtaining, from the points of the sub-cloud of points of the reference surface, the points corresponding to the transformed control points of the real surface;
  l) Obtaining the motion that minimizes the distances between the transformed control points of the real surface and the obtained correspondence points;
  m) Verifying if the distances between the transformed control points of the real surface and the correspondence points are smaller than the predetermined value.

This way, the method iteratively runs until convergence between the real surface and the reference surface is obtained.

Alternatively, in case of positive result in step (i), the method may comprise a step (n) of transforming the cloud of points of the real surface according to the motion that minimizes the distances between the control points of the real surface and the correspondence points.

By means of said transformation the real surface is moved near the reference surface, said proximity depending on the accuracy of the correspondences.

Also, in case of positive result in step (m), the method may comprise a step (o) of transforming the cloud of points of the real surface according to the motion that minimizes the distances between the transformed control points of the real surface and the correspondence points.

In case of negative result in step (m), the control of the method may go to step (j) of transforming the control points of the real surface according to the motion that minimizes the distances between the control points of the real surface and the correspondence points.

According to an embodiment of the invention, step (f) of obtaining the control points comprises the sub-steps of:
  f.1) Converting the sub-cloud of points of the real surface to a bi-dimensional space of normal vectors;
  f.2) Generating sets of points having similar normal vector among the points of the sub-cloud of points of the real surface;
  f.3) Obtaining, for each set of points with similar normal vector, one point that is a control point of the real surface.

Said step (f) consists on obtaining the most representative points of the real surface taking into account their normal vector.

According to another embodiment of the invention, step (g) of obtaining the points corresponding to the control points of the real surface comprises the sub-steps of:
  g.1) Providing the normal vector of each point of the sub-cloud of points of the reference surface;
  g.2) Determining the points of intersection between each normal vector of the control points of the real surface and the sub-cloud of points of the reference surface;
  g.3) Obtaining the tangent plane at each intersection point by using the normal vector of the intersection point;
  g.4) Obtaining each correspondence point as the point at the tangent plane that minimize the distances with the control point.

According to yet another embodiment of the invention, step (h) of obtaining the motion that minimizes the distances comprises the sub-steps of:
  h.1) Obtaining a covariance between the control points and their correspondence points;
  h.2) Obtaining the rotation from the obtained covariance;
  h.3) Determining a translation according to the obtained rotation and the mean of the points of the sub-cloud of points of the real surface and the points of the sub-cloud of points of the reference surface.

Said sub-step (h.1) of obtaining the covariance may comprise the sub-steps of:
  h.1.1) Determining the partial covariances between each control point and its correspondence point;
  h.1.2) Determining the mean of the partial covariances;
  h.1.3) Determining the covariance of the mean of the control points and their correspondence points;
  h.1.4) Obtaining the covariance from the mean of the partial covariances and the covariance of the mean of the control points and their correspondence points.

According to another aspect, the invention provides a computer program comprising program instructions for causing a computer to perform the method for aligning a three-dimensional surface representing a real object and a three-dimensional reference surface. Said computer program may be embodied on storing means (for example, on a record medium, on a computer memory or on a read-only memory) or carried on a carrier signal (for example, on an electrical or optical carrier signal).

According to another aspect of the invention, it provides a system for aligning a three-dimensional surface representing a real object and a three-dimensional reference surface, the system comprising means for providing a cloud of points representing the reference surface; means for obtaining a cloud of points representing the real surface; means for scaling the cloud of points of the reference surface for obtaining a sub-cloud of points; means for scaling the cloud of points of the real surface for obtaining a sub-cloud of points; means for determining the normal vector of each point of the obtained sub-cloud of points of the real surface; means for obtaining, among the points of the sub-cloud of points of the real surface, control points according to the determined normal vector of said points; means for obtaining, from the points of the sub-cloud of points of the reference surface, the points corresponding to the control points of the real surface; means for obtaining the motion that minimizes the distances between the control points of the real surface and the obtained correspondence points.

According to another aspect, the invention provides a method for controlling the quality of manufacturing of a real object comprising the method for aligning a three-dimensional surface representing the real object and a three-dimensional reference surface, and the steps of:

p) Comparing the cloud of points representing the reference surface and the cloud of points representing the real surface;
q) Obtaining the discrepancies between the real surface and the reference surface from the comparison of the cloud of points representing the real surface and the cloud of points representing the reference surface.

According to yet another aspect, the invention provides a computer program comprising program instructions for causing a computer to perform the method for controlling the quality of manufacturing of a real object.

According to another aspect, the invention provides a system for controlling the quality of manufacturing of a real object comprising the system for aligning a three-dimensional surface representing the real object and a three-dimensional reference surface, and means for comparing the cloud of points representing the reference surface and the cloud of points representing the real surface and means for obtaining the discrepancies between the real surface and the reference surface from the comparison of the cloud of points representing the real surface and the cloud of points representing the reference surface.

According to another aspect, the invention provides a method for aligning a three-dimensional surface representing a real object and a three-dimensional reference surface, the method comprising the steps of:

a) Providing a cloud of points representing the reference surface;
b) Obtaining a cloud of points representing the real surface;
d) Scaling the cloud of points of the real surface for obtaining a sub-cloud of points;
e) Determining the normal vector of each point of the obtained sub-cloud of points of the real surface;
f) Obtaining, among the points of the sub-cloud of points of the real surface, control points according to the determined normal vector of said points;
g) Obtaining, from the points of the cloud of points of the reference surface, the points corresponding to the control points of the real surface;
h) Obtaining the motion that minimizes the distances between the control points of the real surface and the obtained correspondence points.

According to another aspect of the invention, it provides a method for aligning a three-dimensional surface representing a real object and a three-dimensional reference surface, the method comprising the steps of:

a) Providing a cloud of points representing the reference surface;
b) Obtaining a cloud of points representing the real surface;
c) Scaling the cloud of points of the reference surface for obtaining a sub-cloud of points;
e) Determining the normal vector of each point of the obtained cloud of points of the real surface;
f) Obtaining, among the points of the cloud of points of the real surface, control points according to the determined normal vector of said points;
g) Obtaining, from the points of the sub-cloud of points of the reference surface, the points corresponding to the control points of the real surface;
h) Obtaining the motion that minimizes the distances between the control points of the real surface and the obtained correspondence points.

DEFINITIONS

The term "normal space" refers to the two-dimensional space of the normal coordinates of the normal vector of the clouds of points. Points whose normal coordinates are equal are represented as a single point in this space.

The term "Quaternion" refers to a vector of four elements that represents a Euclidean rotation. Rotation matrix can be easily obtained using quaternion elements.

BRIEF DESCRIPTION OF THE DRAWINGS

In the following detailed description of some possible embodiments, other features and advantages of the invention will appear, each description being made with reference to the following drawings:

FIG. 2 is a graphical representation of the parameters alpha and beta used for the transformation of FIG. 1;

FIG. 3 is a flow chart illustrating the method for aligning a three-dimensional surface representing a real object and a three-dimensional reference surface, according to the invention;

FIG. 6 is a schematic diagram illustrating the system for aligning a three-dimensional surface representing a real object and a three-dimensional reference surface, according to the invention.

DETAILED DESCRIPTION

In the present description, a preferred embodiment of a method and a system for aligning a three-dimensional surface representing a real object and a three-dimensional reference surface according to the invention will be described.

In said preferred embodiment, the invention is a part of a quality control method, for example, applied to a line of manufacturing a determined plastic piece. With the invention, it is possible to control each manufactured piece and not only a part of them.

Figure 1:
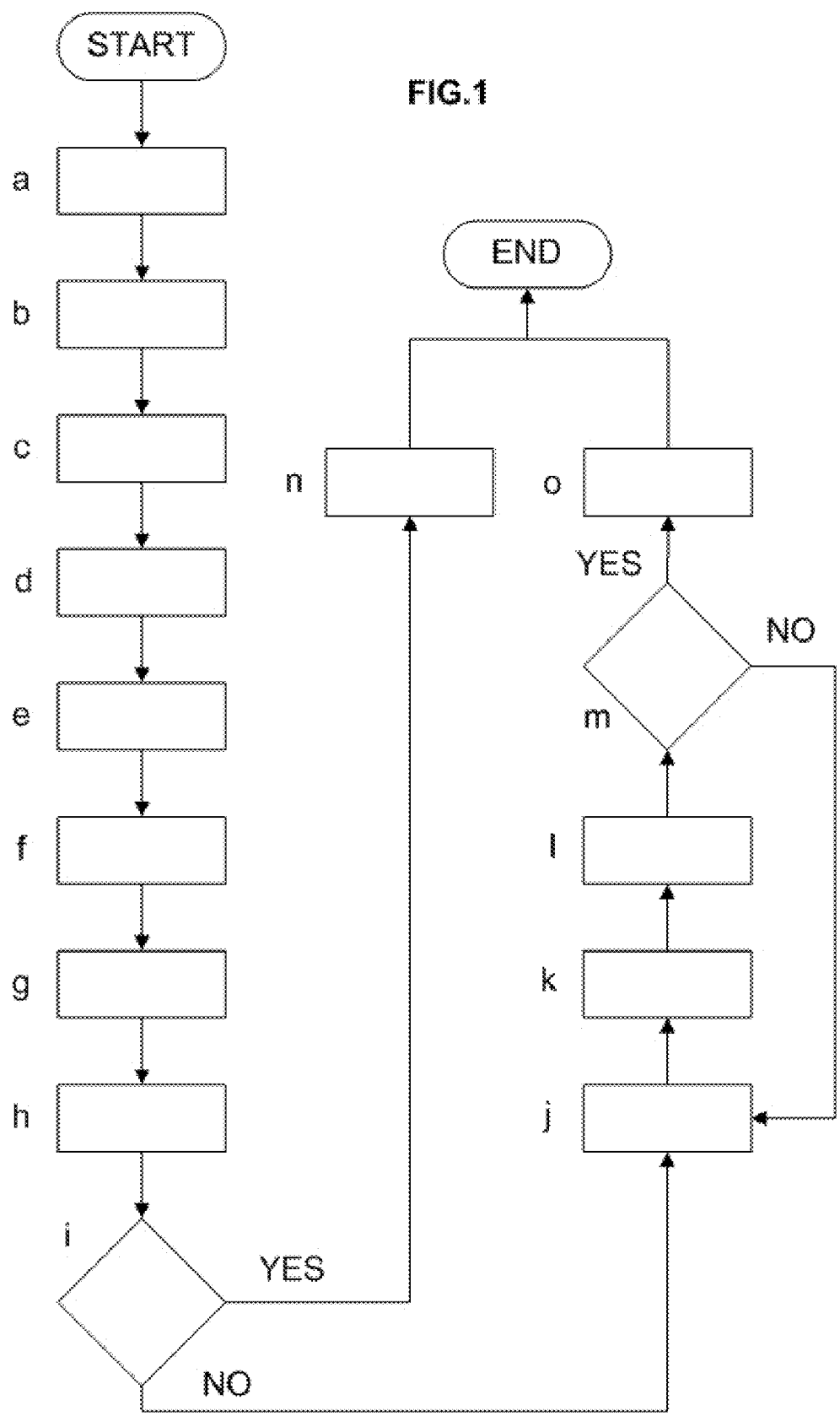
FIG. 1 is a schematic diagram illustrating the transformation of the Euclidean space to the normal space.

As can be seen in FIG. 1, the method according to the invention, beginning in a idle state, comprises a step (a) of providing the cloud of points representing the original plastic piece as the reference surface, said cloud of points being previously obtained. Next, in a step (b), the cloud of points representing the manufactured plastic piece is obtained; in a step (c), the cloud of points of the reference surface (original plastic piece) is scaled to simplify the representation of the said surface, and, in a step (d), the cloud of points of the real surface (manufactured plastic piece) is scaled for reducing the number of points representing said surface. In both cases, a sub-cloud of points is obtained.

It is important to highlight that is possible to execute only one of the steps (c) and (d), but the highest time reduction for aligning the surfaces is obtained executing the two steps.

Following, the method comprises a step (e) of determining the normal vector of each point of the obtained sub-cloud of points of the real surface and, according to said normal vectors, in a step (f), control points among the points of the sub-cloud of points of the real surface are obtained. Next, in a step (g), the points corresponding to the obtained control points in step (f) from the points of the sub-cloud of points of the reference surface are obtained and, in a step (h), the motion that minimizes the distances between the control points of the real surface and the obtained correspondence points is obtained.

Once the distances are minimized, in step (i), the method verifies if the distances between the control points of the real surface and the correspondence points are smaller than a predetermined value, said value being related to the required accuracy on the alignment.

In case of positive result in step (i), the method comprises a step (n) of transforming the cloud of points of the real surface according to the motion that minimizes the distances between the control points of the real surface and the correspondence points. In this moment, the aligning method is finished and the real surface and the reference surface may be compared for quality control reasons.

In case of negative result in step (i) (i.e. the distances are higher than the predetermined value), in a step (h), the control points are transformed according to the motion that minimizes the distances between the control points and the correspondence points and, in a step (k), the points corresponding to the control points, from the points of the sub-cloud of points of the reference surface, are obtained. Next, in a step (l) the motion that minimizes the distances between the transformed control points and the correspondence points are obtained and the method verifies, in a step (m) if the distances between the transformed control points and the correspondence points are smaller than the predetermined value.

In case of positive result in step (m), the method comprises a step (o) of transforming the cloud of points of the real surface according to the motion that minimizes the distances between the transformed control points of the real surface and the correspondence points. In this moment, the real surface and the reference surface are aligned and the method is finished. From said situation, the two surfaces may be compared for quality control applications.

In case of negative result in step (m), the control of the method goes to step (j) of transforming the control points according to the motion that minimizes the distances between the control points and the correspondence points. That is, this part of the method iteratively is executed until convergence between the real surface and the reference surface are obtained (i.e. the distances between the control points and the correspondence points are smaller than the predetermined value).

More specifically, step (f) of obtaining the control points comprises a sub-step (f.1) of converting the sub-cloud of points of the real surface to a bi-dimensional space of normal vectors (see FIG. 2 and FIG. 3); a sub-step (f.2) of generating sets of points having similar normal vector among the points of the sub-cloud of points of the real surface, and, next, a sub-step (f.3) of obtaining, for each set of points with similar normal vector, one point that is a control point of the real surface.

The control points of step (f) are obtained according to a "Normal Space Sampling" process that consists on the selection of the most representative points of the real surface taking into account their normal vector. As can be seen in FIG. 2 and FIG. 3, said process transforms the three-dimensional points of the real surface in a normal space. In this space, points with the same normal vector are located in the same coordinates. A two-dimensional grid is used to classify all points with similar normal vector. The axes of this space are alpha and beta that parameterize the three coordinates of the normal vector. Alpha ($\alpha$) represents the angle between the normal vector and the plane YZ, and beta ($\beta$) represents the angle between the plane XZ and the projection of the normal vector on the plane YZ as is shown in FIG. 1. Alpha and beta can be calculated as follows:

$$\alpha = \operatorname{atan2}(N_x, \sqrt{N_y^2 + N_z^2})$$

$$\beta = \operatorname{atan2}(N_y, N_z)$$

where $N_x$ is the X-component of the normal vector, $N_y$ is the Y-component of the normal vector, and $N_z$ is the Z-component of the normal vector.

As can be seen in FIG. 2, the bi-dimensional normal space is divided in cells. The number of cells defines the resolution of the sampled sub-cloud of points representing the real surface. For a given point, its cell can be obtained taking into account the minimum and maximum values of alpha and beta, and the number of cells in each direction must be taken into account.

Each point of the sub-cloud of points of the real surface has associated indexes for alpha and beta, which are obtained from the formulas:

$$index_a = (\text{alpha} - alpha_{min}) \cdot \frac{N_{cells\ in\ direction\ alpha}}{(alpha_{max} - alpha_{min})}$$

$$index_b = (\text{beta} - beta_{min}) \cdot \frac{N_{cells\ in\ direction\ beta}}{(beta_{max} - beta_{min})}$$

where $N_{cells}$ in direction alpha and beta are the numbers of cells of the bi-dimensional normal space in the alpha direction and beta direction respectively.

When each point is located on its cell depending on alpha and beta parameters, only one point of each cell is selected. In ideal case, after the sampling, the number of points is the same as the number of cells. However, as there are empty cells, the final number of points obtained is often smaller than the number of cells. In order to select the best point in each cell, the orientation of the normal vector is used. The orientation represents the inclination of the normal vector.

The point of the each cell whose orientation is more similar to the ideal one is selected as a most representative one. Ideal orientation can be defined as the orientation of the ideal central element of the cell. Finally, the sampled sub-cloud of points is composed by selected points inside cells.

More specifically, step (g) of obtaining the points of the reference surface corresponding to the control points of the real surface comprises a sub-step (g.1) of providing the normal vector of each point of the sub-cloud of points of the reference surface, a step (g.2) of determining the points of intersection between each normal vector of the control points of the real surface and the sub-cloud of points of the reference surface, a sub-step (g.3) of obtaining the tangent plane at each intersection point by using the normal vector of the intersection point, and a sub-step (g.4) of obtaining each correspondence point as the point at the tangent plane that minimizes the distances with the control point.

Figure 4:
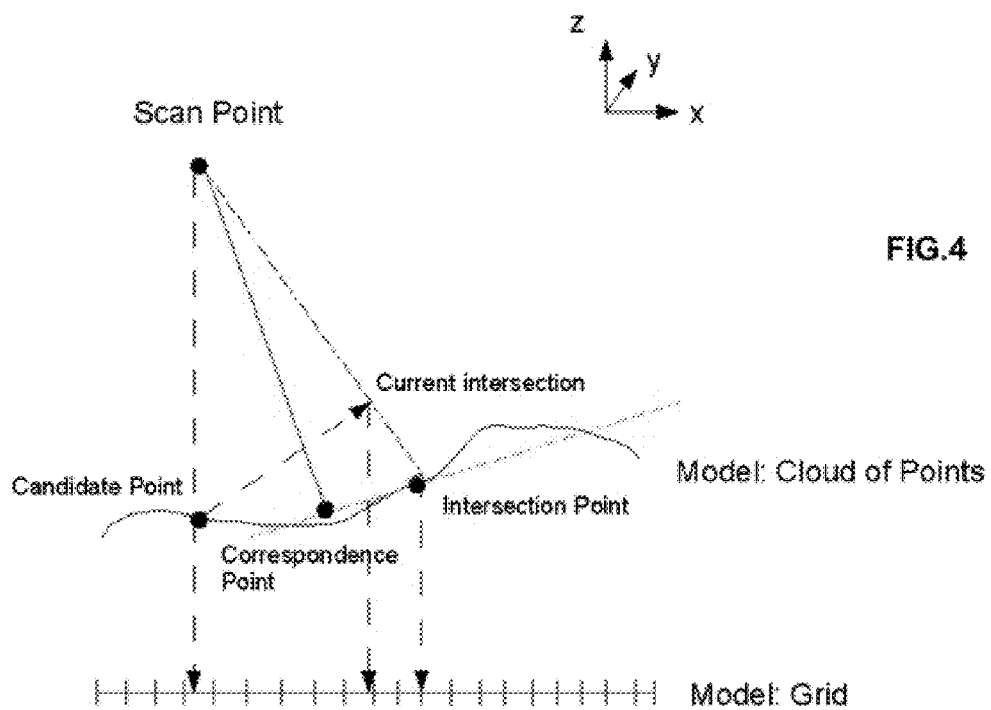
FIG. 4 is a schematic diagram of the steps for obtaining a correspondence.

Basically, step (g) consists of determining the best pair of real and reference points. As real and reference surfaces can be far one from the other, it is difficult to find accurate correspondences. To solve this problem, an iteration process is applied, searching for correspondences each time the real surface is moved to the reference surface. In each iteration, correspondences are found as the minimum distance between points of the real surface and tangent planes of the reference surface. The main object is to determine the intersection of the normal vector of the point of the real surface onto the reference surface. However, as surface is composed by a set of unorganized points, intersection is not easy to obtain. To get this intersection point, approximations are done as is shown in FIG. 4.

Firstly, an auxiliary grid is built containing all points of the reference surface. This grid is a planar representation of the reference surface taken into account only the X and Y coordinates of the three-dimensional points. In each cell of the grid there are all points whose projection onto the Z plane are similar. All points inside the same cell of the grid are sorted by the orientation of the normal vector. This fact speeds up the process to find the most similar point inside the cell.

Then, the real point is orthogonally projected to the grid. This projection is done by obtaining the indexes of the cells as follows:

$$index_x = \frac{point_x - min_x}{max_x - min_x} \cdot N_{cells\ in\ x\text{-}direction}$$

A similar equation is used for the Y coordinate. When both indexes are obtained, the corresponding cell is analyzed to find the most similar point. To find similar points, the orientation of each one is used. The point of the cell with similar orientation is selected as the candidate point.

When candidate point is found, projection of the vector between candidate point and real point onto the normal vector is done, obtaining the current approximation of the intersection. If the distance between this new point and the candidate point (distance from point to candidate) is smaller than a given threshold, the candidate point is good enough to be considered as an approximation of the intersection. Otherwise, this current intersection is projected onto the grid to find another candidate point and improved approximation of the intersection. This process goes until convergence or until a given number of iterations is exceeded. A maximum number of iterations is required because depending on the surface, there are divergence problems.

When the intersection point is found, a tangent plane is located on it. To build this plane, normal vector of the intersection point is used. Finally, the nearest distance between this plane and the real surface is determined (distance to plane). Using this distance, the nearest point is selected as the correspondence.

Step (h) of obtaining the motion comprises a sub-step (h.1) of obtaining a covariance between the control points and their correspondence points, a sub-step (h.2) of obtaining the rotation from the obtained covariance, and a sub-step (h.3) of determining a translation according to the obtained rotation and the mean of the points of the sub-cloud of points of the real surface and the points of the sub-cloud of points of the reference surface.

More specifically, when all correspondence points are determined, distances between them must be minimized. To find the Euclidean motion that minimizes the distances, covariance matrix must be obtained to find the rotation matrix. Using said rotation matrix and the mean of the real points and the reference points, translation vector is determined. In order to find this covariance matrix, several steps are required: a sub-step (h.1.1) of determining the partial covariance matrix between each control point and its correspondence point; a sub-step (h.1.2) of determining the mean of the partial covariance matrix; a sub-step (h.1.3) of determining the covariance matrix of the mean of the control points and their correspondence points, and a sub-step (h.1.4) of obtaining the covariance matrix from the mean of the partial covariance matrix and the partial covariance matrix and the covariance matrix of the mean of the control points and their correspondence points.

$$PartialCovarianceMatrix = \begin{bmatrix} c_x p_x & c_x p_y & c_x p_z \\ c_y p_x & c_y p_y & c_y p_z \\ c_z p_x & c_z p_y & c_z p_z \end{bmatrix}$$

where c and p are the reference and real point coordinates. Then, the accumulated covariance matrix is computed as the mean of all of them. Then, a partial covariance matrix is computed using the mean of the real point and the correspondence point. This matrix is subtracted to the accumulated matrix. The result is the final covariance matrix. In summary, covariance matrix is computed as the discrepancy between the mean of the partial covariance matrix and the covariance matrix of the center of gravity of real and reference correspondences.

The covariance matrix contains all required information to get the rotation matrix that best fits both clouds of points. However, several steps are required to obtain the matrix. First of all, the antisymmetric matrix is obtained as follows:

$$A = C - C^T$$

where C is the covariance matrix. Using the elements of the covariance and the antisymmetric matrix, a 4×4 matrix can be build as:

$$Q = \begin{bmatrix} c_{11} + c_{22} + c_{33} & a_{23} & a_{31} & a_{12} \\ a_{23} & c_{11} - c_{22} - c_{33} & c_{12} + c_{21} & c_{13} + c_{31} \\ a_{31} & c_{21} + c_{12} & c_{22} - c_{11} + c_{33} & c_{23} + c_{32} \\ a_{12} & c_{31} + c_{13} & c_{23} + c_{32} & c_{33} - c_{11} - c_{22} \end{bmatrix}$$

When matrix Q is obtained, rotation matrix can be directly obtained using eigen values function. The eigen vector of Q associated with the maximum eigen value is directly the rotation vector (expressed in quaternions). To solve the eigen problem characteristical polynomial must be found. The solution of the polynomial gives the quaternion vector.

When rotation matrix is obtained, translation vector must be found directly as the vector that aligns the mean of both clouds of points.

$$t = \begin{bmatrix} \mu_x^M \\ \mu_y^M \\ \mu_z^M \end{bmatrix} - R \cdot \begin{bmatrix} \mu_x^S \\ \mu_y^S \\ \mu_z^S \end{bmatrix}$$

where $\mu^M$ and $\mu^S$ represent the mean of the reference surface and the real surface respectively and R is the rotation matrix.

When rotation matrix and translation vector are determined, this transformation can be applied to all points of the real surface decreasing the distance between both clouds of points. After this transformation, the method stops when the rotation and the translation are near to zero.

Figure 5:
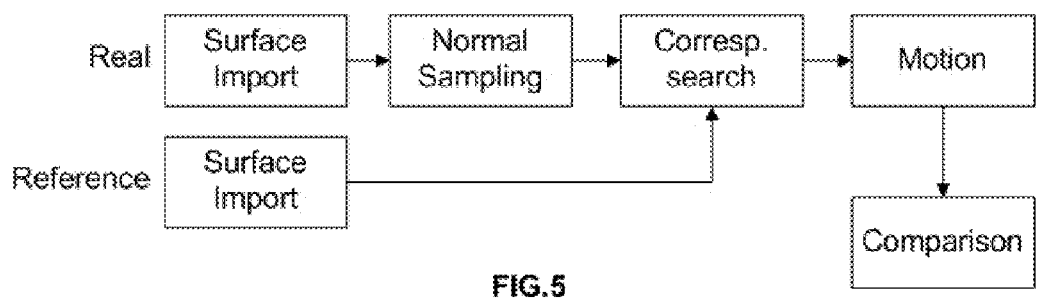
FIG. 5 is a schematic diagram illustrating the method for controlling the quality of manufacturing of a real object, according to the invention.

The aim of the preferred embodiment is to compare three-dimensional surface, that is, the real surface (manufactured plastic piece) and the reference surface (original plastic piece). Concretely, the comparison is done between the real object and the reference surface in order to detect possible errors in the manufacturing process. In FIG. 5, it is possible to see a diagram of the surface comparison modules.

According to the previous description, in order to compare both surfaces they must be aligned. To align both surfaces, it is necessary to provide the cloud of points representing the reference surface and to obtain the cloud of points representing the real surface, the cloud of points of the reference surface and the cloud of points of the real surface being transformed to the bi-dimensional normal space.

With the "Normal Sampling" process, it selects more significant points of the real surface that are used as control points. Next, said control points are searched on the reference surface for establishing correspondences between real and reference points.

The motion that best align the surfaces is then found by minimizing the distances between correspondences. By using said motion information, the real surface is aligned to the reference surface and comparison may be done, generating a disparity map, that is, the motion information aligns both real and reference surfaces and the discrepancy between them is obtained.

In summary, the method for controlling the quality of manufacturing of a real object comprises the method for aligning the real surface and the reference surface, a step (p) of comparing the cloud of points representing the reference surface and the cloud of points representing the real surface, and a step (q) of obtaining the discrepancies between the real surface and the reference surface, from the comparison of step (p).

Following, the system for aligning the real surface and the reference surface will be described. Basically, the system comprises two devices interconnected between them. The first device is a computer and the second device is a FPGA (Field Programmable Gate Array). This way, it is possible to perform a part of operations in the computer and the rest in the FPGA for taking advantage of the features of each device. FPGA allows performing different operations in parallel, reducing the computing time. On the other hand, the computer allows easily performing floating-point operations.

The computer comprises a first module 10 for obtaining the cloud of points representing the real surface; a second module 11 for scaling the cloud of points of the real surface for obtaining the sub-cloud of points of the real surface; a third module 12 for determining the normal vector of each point of the sub-cloud of points of the real surface; a fourth module 13 for obtaining, among the points of the sub-cloud of points of the real surface, control points according to the normal vector of said points; a fifth module 14 for obtaining the motion that minimizes the distances between the control points of the real surfaces and the correspondence points; and a sixth module 15 for obtaining the disparity map between the two surfaces.

On the other hand, the FPGA comprises a first module 20 for providing the cloud of points of the reference surface, from a memory of reference surfaces; a second module 21 for scaling the cloud of points of the reference surface for obtaining the sub-cloud of points of the reference surface; a third module 22 for obtaining, from the points of the sub-cloud of points of the reference surface, the points corresponding to the control points of the real surface; a fourth module 23 for transforming the control points of the real surface; a fifth module 24 for obtaining the covariance matrix; a sixth module 25 for aligning the two surfaces; a seventh module 26 for obtaining the range map; a first memory 27 (for example a RAM memory) for storing the cloud of points of the real surface; and a second memory 28 (for example a RAM memory) for storing the cloud of points of the reference surface.

Firstly, the cloud of points of the reference surface is stored in the second memory 28 of the FPGA. Following, the cloud of points of the real surface is obtained and stored in the first memory 27. Next, the normal vectors of the cloud of points of the real surface are obtained and the control points are determined, according the obtained normal vectors. Said steps of obtaining the normal vectors and obtaining the control points are performed in the computer.

In a following step, the control points are stored in a memory (not shown). Step of obtaining the corresponding points of the control points from the cloud of points of the reference surface is performed in the FPGA, such that it is possible to search several correspondences in parallel, which is not possible in a computer. For each correspondence point, a covariance matrix is obtained and, once all correspondence points are obtained, the mean covariance matrix is also obtained. Using this covariance matrix, the rotation matrix and translation vector is determined. Then, the design determines if it is necessary to perform more iterations for aligning the two surfaces. In case of negative response, FPGA transforms the points of the cloud of points of the real surface. Next, a range map is determined and it is sent to the computer, which compares it with the range map of the reference surface for obtaining the disparity map.

Although the present invention has been described in detail for purpose of illustration, it is understood that such detail is solely for that purpose, and variations can be made therein by those skilled in the art without departing from the scope of the invention.

Thus, while the preferred embodiments of the methods and of the systems have been described in reference to the environment in which they were developed, they are merely illustrative of the principles of the invention. Other embodiments and configurations may be devised without departing from the scope of the appended claims.

Further, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method for associating a three-dimensional surface representing a real object and a three-dimensional reference surface, said reference surface being represented by a set of reference points, the method comprising:
    obtaining a set of real points representing the real surface;
    determining the normal vector of each point of said obtained set of real points;
    selecting, among the set of real points, control points according to the determined normal vector by
        converting the set of real points to a bi-dimensional space of normal vectors;
        generating sets of points having similar normal vector among the points of the set of real points; and
        selecting, for each set of points with similar normal vector, one point that is a control point of the real surface;
    determining correspondence points close to the set of reference points that are determined to correspond to the control points of the real surface; and
    determining the motion that minimizes the distances between the control points of the real surface and the correspondence points;
        wherein determining correspondence points close to the set of reference points that are estimated to correspond to the control points of the real surface comprises the sub-steps of:
    retrieving or determining the normal vector of each point of the set of reference points;
    determining the points of intersection between each normal vector of the control points of the real surface and the set of reference points;
    obtaining the tangent plane at each intersection point by using the normal vector of the intersection point; and
    obtaining each correspondence point as the point at the tangent plane that has the minimum distance to the control point.

2. A method according to claim 1, wherein said set of reference points representing the reference surface is obtained by scaling a larger collection of reference points.

3. A method according to claim 1, wherein obtaining a set of real points representing a real surface comprises
    obtaining a first larger collection of points representing a real surface, and
    scaling said larger collection of points for obtaining a set of real points.

4. A method according to claim 1, further comprising
    verifying if the distances between the control points of the real surface and the correspondence points are smaller than a predetermined value.

5. A method according to claim 4, further comprising, if the distances between the control points of the real surface and the correspondence points are bigger than a predetermined value, the following steps:
    (i) transforming the control points of the real surface according to the motion that minimizes the distances between the control points of the real surface and the correspondence points;
    (ii) determining correspondence points by determining, points close to the set of reference points, that are estimated to correspond to the transformed control points of the real surface;
    (iii) obtaining the motion that minimizes the distances between the transformed control points of the real surface and the obtained correspondence points; and
    (iv) verifying if the distances between the transformed control points of the real surface and the correspondence points are smaller than the predetermined value.

6. A method according to claim 5, further comprising, if the distances between the transformed control points of the real surface and the correspondence points are smaller than the predetermined value:
    transforming the set of real points according to the motion that minimizes the distances between the transformed control points of the real surface and the correspondence points.

7. A method according to claim 4, further comprising, if the distances between the control points of the real surface and the correspondence points are smaller than a predetermined value,
    a step of transforming the set of real points according to the motion that minimizes the distances between the control points of the real surface and the correspondence points.

8. A method according to claim 5, wherein, if the distances between the transformed control points of the real surface and the correspondence points are bigger than the predetermined value,
    said steps (i), (ii) and (iii) are repeated.

9. A method according to claim 1, wherein determining the motion that minimizes the distances between the control points of the real surface and the obtained correspondence points comprises the sub-steps of:
    determining a covariance between the control points and their correspondence points;
    obtaining the rotation from the obtained covariance; and
    determining a translation according to the obtained rotation and the mean of the points of the set of real points and the points of the set of reference points.

10. A method according to claim 9, wherein said sub-step of determining the covariance comprises the sub-steps of:
    determining the partial covariances between each control point and its correspondence point;
    determining the mean of the partial covariances;
    determining the covariance of the mean of the control points and their correspondence points; and
    obtaining the covariance from the mean of the partial covariances and the covariance of the mean of the control points and their correspondence points.

11. A computer program stored on a non-transitory storage medium, the computer program comprising program instructions for causing a computer to perform the method according to claim 1.

12. A method for controlling the quality of manufacturing of a real object comprising:
    obtaining a set of real points representing the real surface;
    determining the normal vector of each point of said obtained set of real points;
    selecting, among the set of real points, control points according to the determined normal vector by
        converting the set of real points to a bi-dimensional space of normal vectors;
        generating sets of points having similar normal vector among the points of the set of real points; and
        selecting, for each set of points with similar normal vector, one point that is a control point of the real surface;
    determining correspondence points close to the set of reference points that are determined to correspond to the control points of the real surface determining the motion that minimizes the distances between the control points of the real surface and the correspondence points and transforming said real surface according to said motion, comparing the set of reference points and the set of real points; and obtaining the discrepancies between the real surface and the reference surface from the comparison of the set of real points and the set of reference points;

wherein determining correspondence points close to the set of reference points that are estimated to correspond to the control points of the real surface comprises the sub-steps of:

retrieving or determining the normal vector of each point of the set of reference points;

determining the points of intersection between each normal vector of the control points of the real surface and the set of reference points;

obtaining the tangent plane at each intersection point by using the normal vector of the intersection point; and obtaining each correspondence point as the point at the tangent plane that has the minimum distance to the control point.

* * * * *